Dec. 11, 1945. H. A. BOTHNER 2,390,916
TOOL
Filed Nov. 11, 1944

INVENTOR.
Herman A. Bothner.
BY
Attorney.

Patented Dec. 11, 1945

2,390,916

UNITED STATES PATENT OFFICE 2,390,916

TOOL

Herman A. Bothner, Springfield, Mass.

Application November 11, 1944, Serial No. 562,941

1 Claim. (Cl. 51—184.3)

This invention relates to improvements in tools and is directed more particularly to improvements in tools for lapping holes, apertures, and the like.

The principal objects of the invention are directed to the provision of a lapping tool having an expansible lap member and provided with novel means for expanding the same.

It is customary in lapping tools to provide means for expanding the same for varying the size thereof but have been objectionable since the means for expanding the lap has resulted in the lap having a non-uniform diameter.

In accordance with this invention the lapping tool is provided which is characterized by an expansible lap member and means for expanding the same to maintain a uniform diameter throughout its length.

Figure 1:
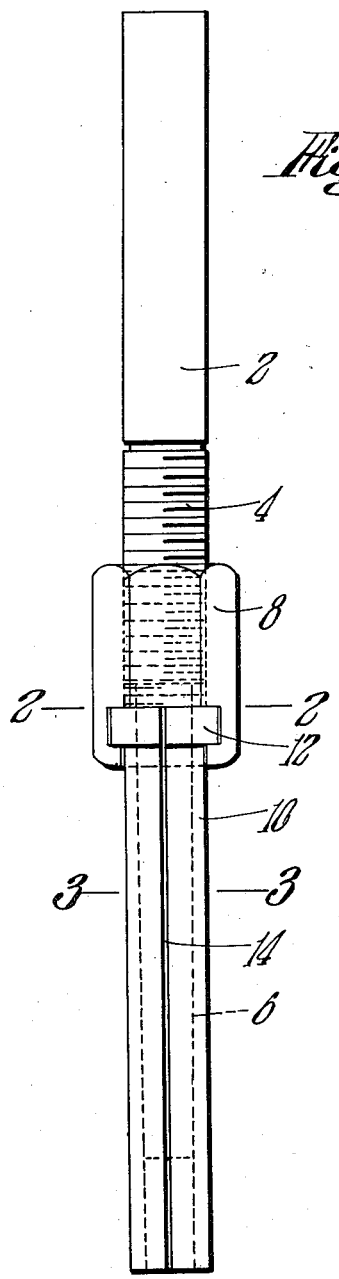
Figure 2:
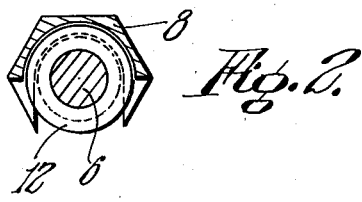
Figure 3:
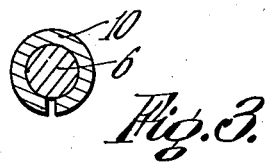

With the foregoing and various other novel features and advantages and other objects of my invention as will become more apparent as the description proceeds, the invention consists in certain novel features of construction and in the combination and arrangement of parts as will be hereinafter more particularly pointed out in the claim hereunto annexed and more fully described and referred to in connection with the accompanying drawing wherein:

Fig. 1 is a side elevational view of a lapping tool embodying the features of the invention; and Figs. 2 and 3 are sectional plan views on the lines 2—2 and 3—3 of Fig. 1.

Referring now to the drawing more in detail, the invention will be fully described.

The main body of the tool of the invention includes a shank portion 2, an intermediate threaded portion 4 and a tapering portion 6.

The shank portion is adapted for engagement by a chuck or other suitable means and, of course, may be manipulated in any desired manner. A nut 8 is provided with an internally threaded socket for engagement with the threaded portion 4.

A lapping element in the form of a sleeve 10 is provided which has a flange 12 on its one end. Said member 10 is split at 14 longitudinally so as to be expansible. The element 10 is also provided with a longitudinal bore which is complemental to the tapering member 6.

The taper of the part 6 and bore of the member 10 may be as desired so that the member 10 may be expanded by the part 6.

The nut 8 is provided with a socket, for receiving the flange 12 of the member 10 and it has a slot to facilitate the insertion of the flange 12 in the socket, see Fig. 2.

The parts may be relatively proportioned as may be desired and the part 10 may be so made and adapted so as to be chargeable with some abrasive material which is for the lapping operation to be performed.

In Fig. 1 the parts are shown in their assembled relation and as the part 4 is screwed into the nut 8 the tapering member 6 causes the lap 10 to expand to the desired degree and, as stated, the member 6 may have any taper desired.

It will be observed that the tool is of such a construction that the lap 10 may be readily and easily expanded to within very narrow limits all to the end that accuracy may be obtained while at the same time the lap has a uniform diameter at all times.

When it is desired to disassemble the tool the part 4 is screwed out of the nut 8 so that the main body may be withdrawn axially through the nut whereby the tapering part is withdrawn from the bore of the lap and then the inner end of the lap member is removed from the nut 8.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

A tool of the class described comprising in combination, an elongated body member having upper manually engageable and lower downwardly tapering portions with a screw threaded portion therebetween, a nut separable from said body having a longitudinal bore screw threaded at its upper end for engaging said screw threaded portion and the lower end thereof having an opening extending outwardly from said bore through a side thereof providing sockets for receiving the upper flange and adjacent portion of a lap member, a one-piece lap member having a flange at its upper end and provided with a longitudinal bore conforming to the lower tapering portion of the body and with a longitudinally extending slot at a side thereof leading into said bore, all adapted and arranged whereby with said nut separated from said body the flange and adjacent portion of the lap member may be inserted in the sockets of the nut and the lower tapering portion of the body may be passed through the bore of the nut into the bore of the lap to engage the screw threads of the body and nut so that on rotation of the nut relative to the body the lower tapering end of the body acts in the bore of the lap to expand it.

HERMAN A. BOTHNER.